July 8, 1924.

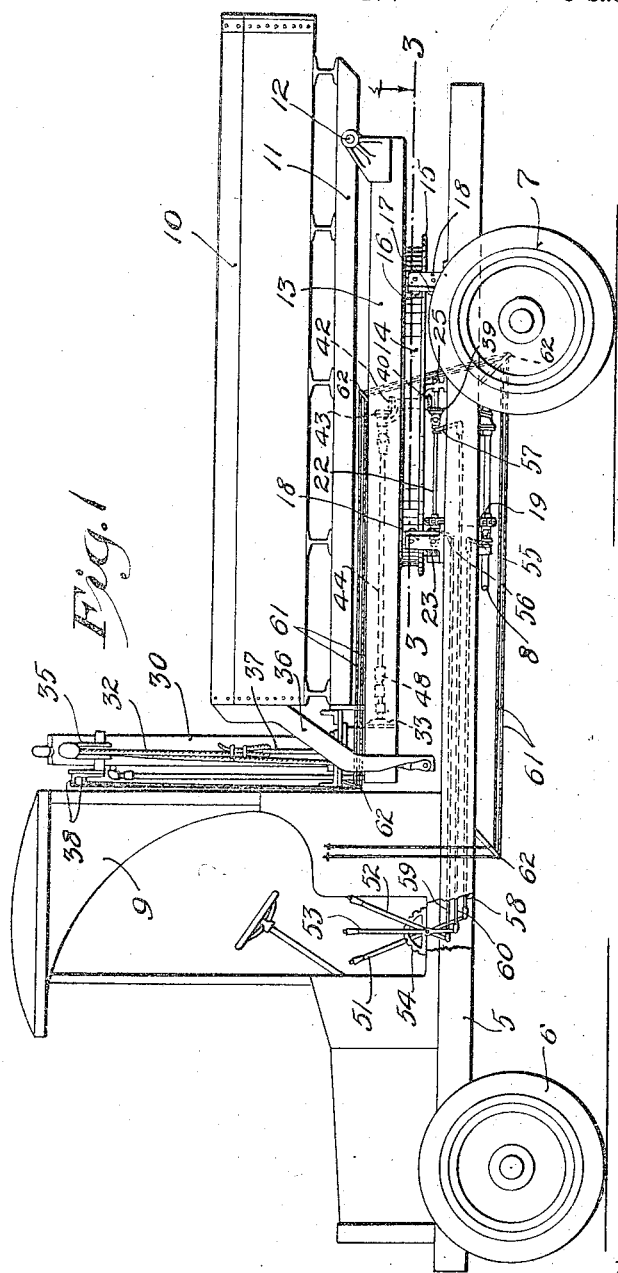

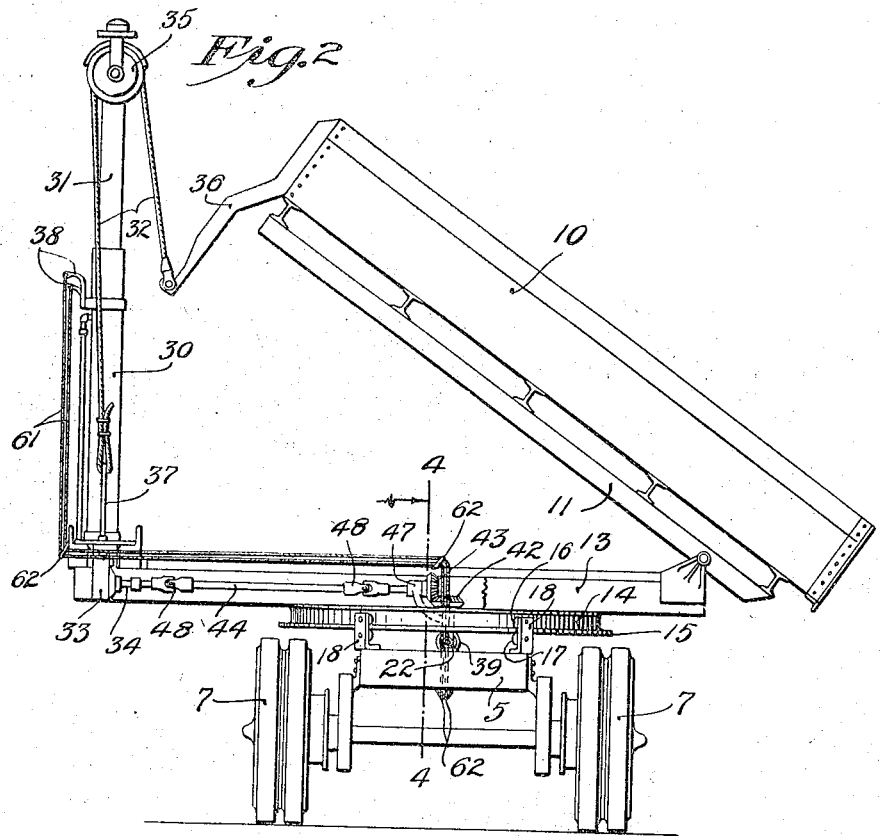
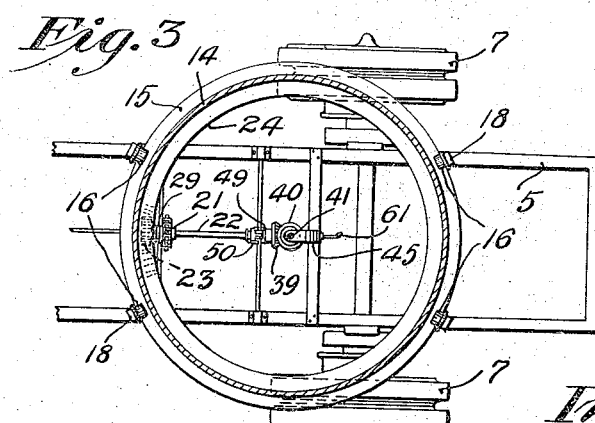

H. M. COLBYSON ET AL 1,500,803

DUMPING VEHICLE

Filed Feb. 17, 1922       3 Sheets-Sheet 3

Inventors
Hardes M. Colbyson
Frank J. Mumm
By their Attorneys

Patented July 8, 1924.

1,500,803

UNITED STATES PATENT OFFICE.

HARDES M. COLBYSON, OF MINNEAPOLIS, AND FRANK J. MUMM, OF ST. PAUL, MINNESOTA.

DUMPING VEHICLE.

Application filed February 17, 1922. Serial No. 537,187.

*To all whom it may concern:*

Be it known that we, HARDES M. COLBYSON and FRANK J. MUMM, citizens of the United States, residing at Minneapolis and St. Paul, in the counties of Hennepin and Ramsey, respectively, and State of Minnesota, have invented certain new and useful Improvements in Dumping Vehicles; and we do hereby declare the following to be a full, clear, and exact description of the invention, such as will enable others skilled in the art to which it appertains to make and use the same.

Our present invention relates to motor-propelled trucks having dumping or tilting bodies, and has for its primary object to mount such bodies for turning movement in a horizontal plane, whereby the load therein, when the body is tilted, may be dumped at the rear of the truck or at any point on either side thereof.

With trucks now in use, it is necessary in delivering coal, when the same must be discharged through a hole in a sidewalk or unloaded and carried, to back the truck to the curb, which is highly objectionable, especially on narrow streets or streets having carlines, as it materially interferes with the traffic. In making such a delivery with a truck having our invention embodied therein, it is only necessary to stop the truck parallel with the curb and then turn its body transversely thereto, in a position to discharge its load over the sidewalk. This method of mounting a truck body is also highly serviceable in road building or in making fills as it permits materials to be dumped over a relatively large area thus saving a large amount of hand shovelling and at the same time said materials may be dumped where it will not be necessary for the wheels of a truck to pass thereover.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a left-side elevation of a motor-propelled truck having the invention embodied therein;

Fig. 2 is a rear elevation showing the truck body tilted and positioned to dump a load on the right side of the truck;

Fig. 3 is a fragmentary plan view with some parts sectioned on the line 3—3 of Fig. 1.

Figure 4:
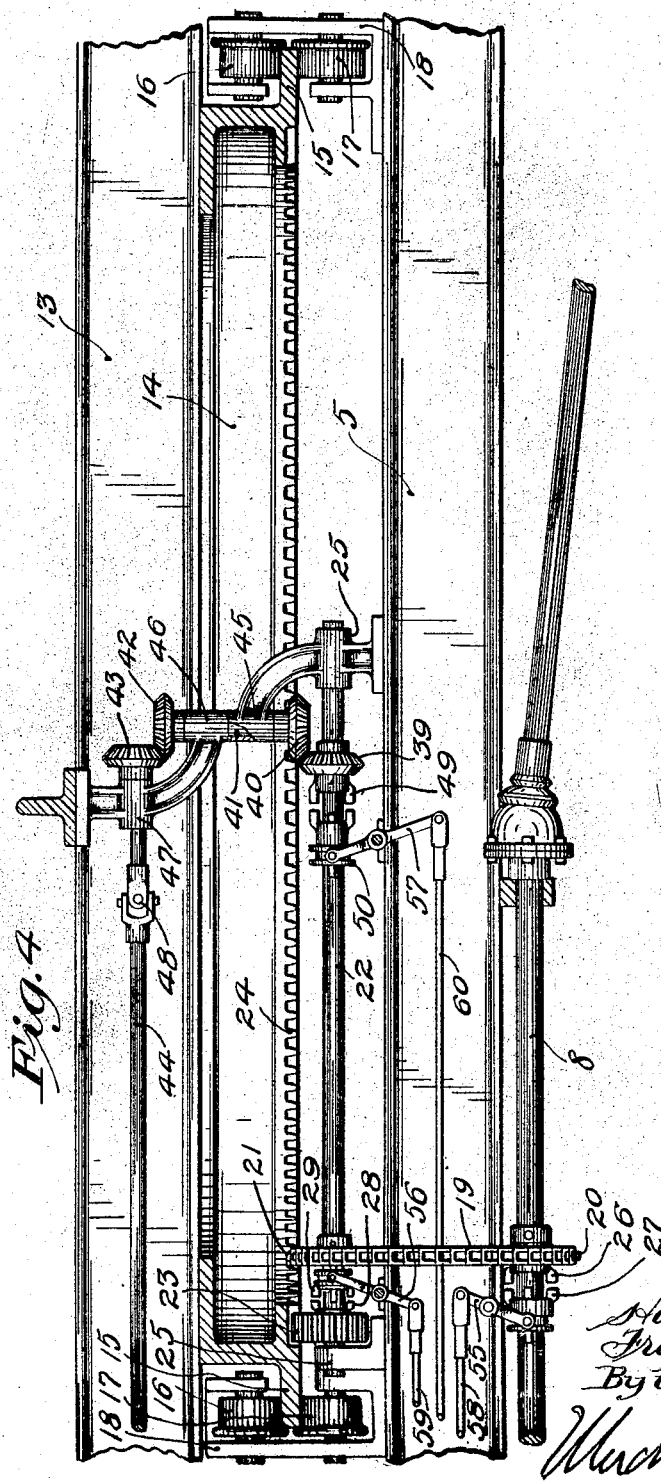
Fig. 4 is a detail view partly in elevation and partly in longitudinal vertical section taken on the line 4—4 of Fig. 2, on an enlarged scale.

Of the parts of the truck proper, it is important to note the main frame 5, front wheel 6, rear wheel 7, engine-driven propeller shaft 8, for the traction wheels, cab 9 and body 10 of the type having a rear end gate. The body 10 is rigidly secured to a frame 11, which is hinged at 12 to the rear end of a supplemental truck frame 13 that rests on and is rigidly secured to a turntable 14 carried by the main truck frame 5. As shown, the turntable 14 is in the form of a horizontally disposed annular body member having at its lower end an outstanding endless track rail or flange 15 mounted between upper and lower pairs of anti-friction rollers 16 and 17, respectively. These rollers 16 and 17 are journaled in brackets 18 rigidly secured to the main truck frame 5. The lower rollers 17 support the turntable 14 and the upper rollers 16 prevent the same from tipping under the tilting action of the body 10, and which rollers 16 and 17 also prevent binding of the turntable therebetween.

The turntable 14 may be operated, at will, from the propeller shaft 8, to position the body 10 so as to dump its load at the rear of the truck or at any desired point on either side thereof, by the following connections, to wit:

A sprocket chain 19 is arranged to run over sprocket wheels 20 and 21 on the propeller shaft 8 and a counter-shaft 22, respectively, and which counter-shaft is provided with a pinion 23 that is loose thereon and meshes with a ring gear 24 on the turntable 14. This ring gear 24, as shown, is integral with the turntable 14 and located in the plane of the track rail 15. The counter-shaft 22 is located above the propeller shaft 8, extends parallel thereto and is journaled in bearings 25, rigidly secured to the main truck frame 5. The sprocket wheel 20 is free to rotate on the shaft 8 and has formed with its hub a half-clutch 26 arranged for co-operation with a sliding half-clutch 27 keyed to the shaft 8 for rotation therewith. The sprocket wheel 21 is keyed to the counter-shaft 22 and when the sprocket wheel 20 is connected to the shaft 8 by the co-operating clutch members 26 and 27, said counter-shaft is driven from the propeller shaft 8. To drive the pinion 23 with the shaft 22 and thereby rotate the turntable 14, there is formed with the hub of said pinion, a half-clutch 28 arranged for co-operation with a sliding half-clutch 29 keyed to the counter-shaft 22 for rotation therewith. Suitable connections for operating the clutches 27 and 29 will presently be described.

To raise the front end of the body 10 and thereby tilt the same at various different angles, on its hinges 12, to dump a load therefrom, there is provided a hydraulic hoist of well known construction. Of the parts of this hydraulic hoist, it is important to note the upright cylinder 30, co-operating piston 31, lifting cable 32, and pump casing 33, in which is mounted a rotor, the shaft of which is indicated by the numeral 34. The cylinder 30 is rigidly secured to the supplemental frame 13 forward of the body 10. Obviously, the cylinder 30 and piston 31 afford a vertically adjustable mast, at the upper end of which is a guide sheeve 35 over which runs the lifting cable 32. One end of the lifting cable 32 is attached to the lower end of a depending arm 36 rigidly secured to the front end of the body 10, and its other end is attached to an anchor bolt 37 secured in the base of the cylinder 30. The liquid in the cylinder 29 is controlled, to project the piston 31 or permit the same to recede, by valves the controlling levers of which are indicated by the numeral 38.

To operate the rotor of the pump of the hydraulic hoist from the counter-shaft 22, either simultaneously with the rotation of the turntable 14 or independently thereof, the following connections are provided, to wit:

Loosely mounted on the counter-shaft 22 but held against axial movement is a bevel gear 39, which meshes with a bevel gear 40 keyed to the lower end of a vertical short shaft 41 having keyed to its upper end a bevel gear 42, which meshes with a bevel gear 43 keyed to the rear end of a long horizontal shaft 44, the forward end of which is attached to the shaft 34 of the pump rotor. The shaft 41 is located at the axis of the turntable 14 to permit the driving connections to the pump rotor to operate in all positions of the turntable. Said shaft 41 is journaled in a pair of bearings 45 and 46, the former of which is integral with the bearing 25 and the latter of which is integral with a bearing 47 rigidly secured to the supplemental truck frame 13 and in which bearing the shaft 44 is journaled. Interposed in the shaft 44 are two universal joints 48. Formed with the hub of the bevel gear 39 is a half-clutch 49 arranged for co-operation with sliding half-clutch 50 keyed to the shaft 42 for rotation therewith.

For independently operating the half-clutches 27, 29 and 50, there are mounted in the truck cab 9 three latch levers 51, 52 and 53, respectively, and co-operating segments indicated as a group by the numeral 54. Connected to the half-clutches 27, 29 and 50 are shipper levers 55, 56 and 57, respectively, and which levers are intermediately fulcrumed to the main truck frame 5 and connected to the respective levers 51, 52 and 53 by connecting rods 58, 59 and 60, respectively.

To position the body 10 and then tilt the same to discharge the load at one side of the truck, the latch lever 51 is manipulated to move the sliding half-clutch 27 into interlocking engagement with the half-clutch 26 and thereby drive the counter-shaft 22 from the propeller shaft 8. The turntable 14 is then operated to move the body 10 transversely of the truck by manipulating the latch lever 52 to carry the sliding half-clutch 29 into interlocking engagement with the half-clutch 28 and thereby connect the pinion 23, which meshes with the ring gear 24 on the turntable 14, to the counter-shaft 22. After the truck body 10 has been properly positioned, the half-clutch 29 is moved out of interlocking engagement with the half-clutch 28 to stop the rotation of the turntable 14. The latch lever 53 is then manipulated to move the half-clutch 50 into interlocking engagement with the half-clutch 49 and thereby drive the shaft 34, of the rotor of the hydraulic hoist, through the connections 39 to 44, inclusive, and 48, to project or elevate the piston 31 and thereby tilt the body 10 and discharge its load therefrom.

To permit the operator of the truck to manipulate the valve controlling levers 38 of the hydraulic hoist, cables 61 are attached to said levers and extended to the cab 9. These cables 61 are extended over guide sheeves 62 and through the turntable 14 substantially at the axis thereof. By thus carrying the cables 61 to the axis of the turntable there will be no slack therein during the various different adjustments of the body 10 in respect to the truck.

What we claim is:

1. A dumping truck comprising a chassis, a rotatable supporting frame, rollers carried by the chassis, an annulus secured to the frame and travelling on said rollers, a tiltable dumping body supported by the frame, means for rotating the frame, a mechanism for tilting said body, said mechanism including a cable extending through said annulus centrally thereof and travelling against sheaves carried by the rotatable frame and the chassis.

2. A dumping truck comprising a horizontally rotatable structure including a tiltable dumping body, a chassis, superposed and interengaging bearing elements carried by said structure and chassis, a sheave on one of said elements, a sheave on said chassis, a cable for tilting said dumping body, said cable travelling against said sheaves and extending through said elements centrally thereof, and means for winding up the cable to tilt said body.

3. In a truck having a motor-driven element and an operator's platform, the combination with a main frame, of a supplemental frame, a turntable supporting the supplemental frame from the main frame, a tilting body on the supplemental frame, a hoist for operating the tilting body, said hoist having a controlling element, a counter-shaft, connections for driving the counter-shaft from the motor-driven element including a clutch, connections for operating the turntable from the counter-shaft, including a clutch, connections for operating the hoist from the counter-shaft including a clutch and a shaft concentric with the axis of the turntable, means at the operator's platform for independently operating said clutches, and an operating connection for said controlling element extending through the turntable substantially at the axis thereof and to the operator's platform.

In testimony whereof we affix our signatures.

HARDES M. COLBYSON.
FRANK J. MUMM.